United States Patent
Dodt et al.

(10) Patent No.: US 6,239,930 B1
(45) Date of Patent: *May 29, 2001

(54) METHOD AND APPARATUS FOR AUTOMATICALLY ACTIVATING A ONE OF VIDEO DATA CHANNEL AND A COMPUTER DATA CHANNEL IN A TAPE DRIVE IN RESPONSE TO DETECTION OF THE NATURE OF THE DATA RECORDED ON A MAGNETIC TAPE LOADED IN THE TAPE DRIVE

(75) Inventors: William Carl Dodt, Broomfield; Jerry Lynn Donze; John Craig Owens, both of Arvada; Brian Patrick Egan, Northglenn; Ralph Leon Butts, Johnstown; Donald R. Schenck, Boulder, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/802,216

(22) Filed: Feb. 19, 1997

Related U.S. Application Data

(63) Continuation of application No. 08/398,457, filed on Mar. 3, 1995, now abandoned, which is a continuation-in-part of application No. 08/242,719, filed on May 13, 1994, now Pat. No. 5,526,198.

(51) Int. Cl.[7] ........................................................ G11B 5/09
(52) U.S. Cl. ............................................................. 360/48
(58) Field of Search ................................ 364/478; 360/92, 360/32, 722, 33.1, 37.1, 38.1, 18, 19.1; 358/336, 906; 369/44.26, 48, 124; 395/162; 348/719; 370/60

(56) References Cited

U.S. PATENT DOCUMENTS

| | | | |
|---|---|---|---|
| 4,216,492 | * 8/1980 | Schmalz | 360/18 X |
| 4,390,906 | * 6/1983 | Furumoto et al. | 360/19.1 |
| 4,789,961 | * 12/1988 | Tindall | 360/33.1 X |
| 5,268,802 | * 12/1993 | Bar | 360/25 X |
| 5,323,327 | * 6/1994 | Carmichael et al. | 360/92 X |
| 5,428,606 | * 6/1995 | Moskowitz | 370/60 |
| 5,452,279 | * 9/1995 | Yokota et al. | 369/48 |
| 5,566,032 | * 10/1996 | Cleveland et al. | 360/72.2 |

FOREIGN PATENT DOCUMENTS

9320647 * 10/1993 (WO).

* cited by examiner

Primary Examiner—David Hudspeth
Assistant Examiner—Dan Davidson
(74) Attorney, Agent, or Firm—Duft, Graziano & Forest

(57) ABSTRACT

The tape drive control unit administers both computer data and video data that is stored on the same type of data storage media. This is accomplished by determining, when a magnetic tape is mounted in the tape drive, the format that is used to store the data on the magnetic tape media. In the case of video data, the data is directly written on to the magnetic tape media, while for computer data, a header is interposed between a leader portion of the magnetic tape on the 3480-type magnetic tape cartridge and the remainder of the magnetic tape contained therein.

12 Claims, 9 Drawing Sheets

| LOGICAL BLOCK NUMBER | PHYSICAL SECTOR | SUB-SECTOR NUMBER | SCAN GROUP COUNT | FILE ID NUMBER | LOGICAL SCAN GROUP COUNT | TYPE OF ENTRY | RESERVED |
|---|---|---|---|---|---|---|---|
| 5 BYTES | 1 BYTE | 1 BYTE | 4 BYTES | 3 BYTES | 4 BYTES | 1 BYTE | 5 BYTES |
| 601 | 602 | 603 | 604 | 605 | 606 | 607 | 608 |

| VOLUME ID | TAPE TYPE | TAPE LENGTH | MFG ID | TAPE DRIVE RECORDS | WRITE PROTECT | LAST SCAN GROUP | ERROR STATISTICS |
|---|---|---|---|---|---|---|---|
| 7 BYTES | 2 BYTES | 1 BYTE | 128 BYTES | 25 BYTES | 1 BYTE | 4 BYTES | X BYTES |
| 701 | 702 | 703 | 704 | 705 | 706 | 707 | 708 |

METHOD AND APPARATUS FOR AUTOMATICALLY ACTIVATING A ONE OF VIDEO DATA CHANNEL AND A COMPUTER DATA CHANNEL IN A TAPE DRIVE IN RESPONSE TO DETECTION OF THE NATURE OF THE DATA RECORDED ON A MAGNETIC TAPE LOADED IN THE TAPE DRIVE

This application is a file wrapper continuation of application Ser. No. 08/398,457, filed Mar. 3. 1995 now abandoned.

CROSS REFERENCE TO RELATED APPLICATIONS

This application is a continuation-in-part of U.S. patent application Ser. No. 08/242,719 titled "Method and Apparatus for Administering Video Data on Magnetic Tape Media", filed May 13, 1994 now U.S. Pat. No. 5,526,198.

FIELD OF THE INVENTION

This invention relates to magnetic data storage media and, in particular, to a method and apparatus for administering a magnetic tape on which can be written video data or computer data.

PROBLEM

It is a problem in the field of data storage systems to manage the storage of video data and computer data that are written on the same type of medium. Magnetic tape has become the industry standard data storage medium for the storage and retrieval of large amounts of data, where the media cost must be kept to a minimum and the data retrieval time is not a critical factor. The data storage capacity has been increased and the media cost of magnetic tape has been reduced by the use of helical scan data recording techniques on magnetic tape for both video data and computer data. Helical scan tape drive systems can make use of either dual reel magnetic tape cassettes or single reel magnetic tape cartridges, both of which use half inch magnetic tape as the recording medium. The dual reel magnetic tape cassette form factor is used in the video recording industry while the single reel magnetic tape cartridge is an industry standard media form factor used in the data processing industry. The selection of the single reel form factor in the data processing industry is desirable due to the fact that automated library systems are presently used to robotically store and retrieve a large number of 3480-type magnetic tape cartridges for an associated plurality of tape drives. Thus, a computer system can access vast quantities of data in a timely manner via the use of the automated library system to retrieve and mount a desired tape cartridgeon a tape drive. In contrast, video cassettes are typically mounted in a video tape drive by a user, with a single tape cassette representing the entirety of the data retrieval process. Thus, the video cassette and computer data cartridge represent data storage media solutions to two diverse and largely mutually exclusive sets of requirements.

In addition, video data differ from computer data in that the video data are presently written in serial form, without the tape drive management of framing information. The video data are presented to the user on a frame basis, yet stored on the magnetic tape on a serial, unindexed basis. In addition, the video data are designed for continuous recording and playback, without error detection and correction being performed on the data. The data are transmitted with any errors that may be included, since by its very nature, video storage and retrieval does not retry a stored data record or play back the data storage medium to correct detected errors. A single pass is all that is available. In contrast, computer data storage systems provide error recovery time in both the reading and writing of data on the data storage medium. It is critical that the data be written correctly and read error free. The data integrity in a computer data storage system is therefore orders of magnitude better than video data storage systems, but computer data storage systems cannot continuously output data as required by video systems due to the error recovery process that is inherent in these systems. Therefore, the video and computer data storage and retrieval systems remain incompatible, in spite of the use of digital recording techniques in the video industry. The medium for both video data and computer data are incompatible, even if they are the same form factor due to the contradictory basic requirements for both systems. Tape drive systems are therefore not equipped to deal with media that can contain either video data or computer data written thereon.

SOLUTION

The above described problems are solved and a technical advance achieved in the field by the method and apparatus of the present invention for administering both computer data and video data that are stored on the same type of data storage medium. This is accomplished by the use of an interface unit that can be located in the control unit of a tape drive subsystem and which determines, when a magnetic tape is mounted in the tape drive, the format that is used to store the data on the magnetic tape medium, such as a 3480-type magnetic tape cartridge he data that are subsequently read from the loaded magnetic tape are then routed to the appropriate data channel in the tape drive subsystem for conventional processing.

In the case of video data, the data are directly written onto the magnetic tape media, while for computer data, a header is interposed between a leader portion of the magnetic tape on the 3480-type magnetic tape cartridge and the remainder of the magnetic tape contained therein. This header segment contains two sections, a first of which is a data record directory that is used by the control unit to denote the location of each data record written onto the magnetic tape as well as administrative information associated with the data record. The second section of the header is an administrative information section that contains data relating to the magnetic tape itself.

In operation, whenever the 3480-type magnetic tape cartridge is mounted in the tape drive subsystem and the magnetic tape contained therein threaded through the tape threading path onto the tape drive takeup reel, the tape drive control unit accesses the header segment of the magnetic tape to read the administrative data written thereon. If a read data record operation is requested and video data are written on the magnetic tape, no header is present and the tape drive subsystem interprets the data recorded on the magnetic tape as video data. In contrast, if a header is present, then computer data are written on the magnetic tape, and the identity of the requested data (data record) is used to scan the data record directory section of the header segment to locate the directory entry relating to the requested data record. Once this directory entry for the requested data record has been located, the control unit can retrieve the information, contained within this directory entry, indicative of the physical position of the requested data record on the magnetic tape. This physical positioning information can then be used by the tape drive subsystem to quickly and precisely position the beging of this data record under the read/write heads of the tape drive subsystem.

Thus, the magnetic tape medium can contain either video data or computer data and the tape drive control unit automatically determines the nature of the data recorded thereon by interpreting the data that are written into the header section of the magnetic tape when the magnetic tape is first mounted in-the tape. drive.

In addition, the tape drive can be used in conjunction with an automated cartridge library system to provide fast access to data of both types, without requiring the automated cartridge library system to maintain two incompatible types of tape drives to service the two types of data. This provides a significant cost savings in that the tape drives are dual function and a single pool of tape drives is maintained in the automated cartridge library for the required data read/write traffic, regardless of the relative quantities of computer data tapes and video data tapes. The single function tape drives would require two pools of tape drives, with the number of drives in each pool having to be set as a function of the relative quantities of computer data tapes and video data tapes.

DETAILED DESCRIPTION
Tape Drive System Architecture

Figure 3:
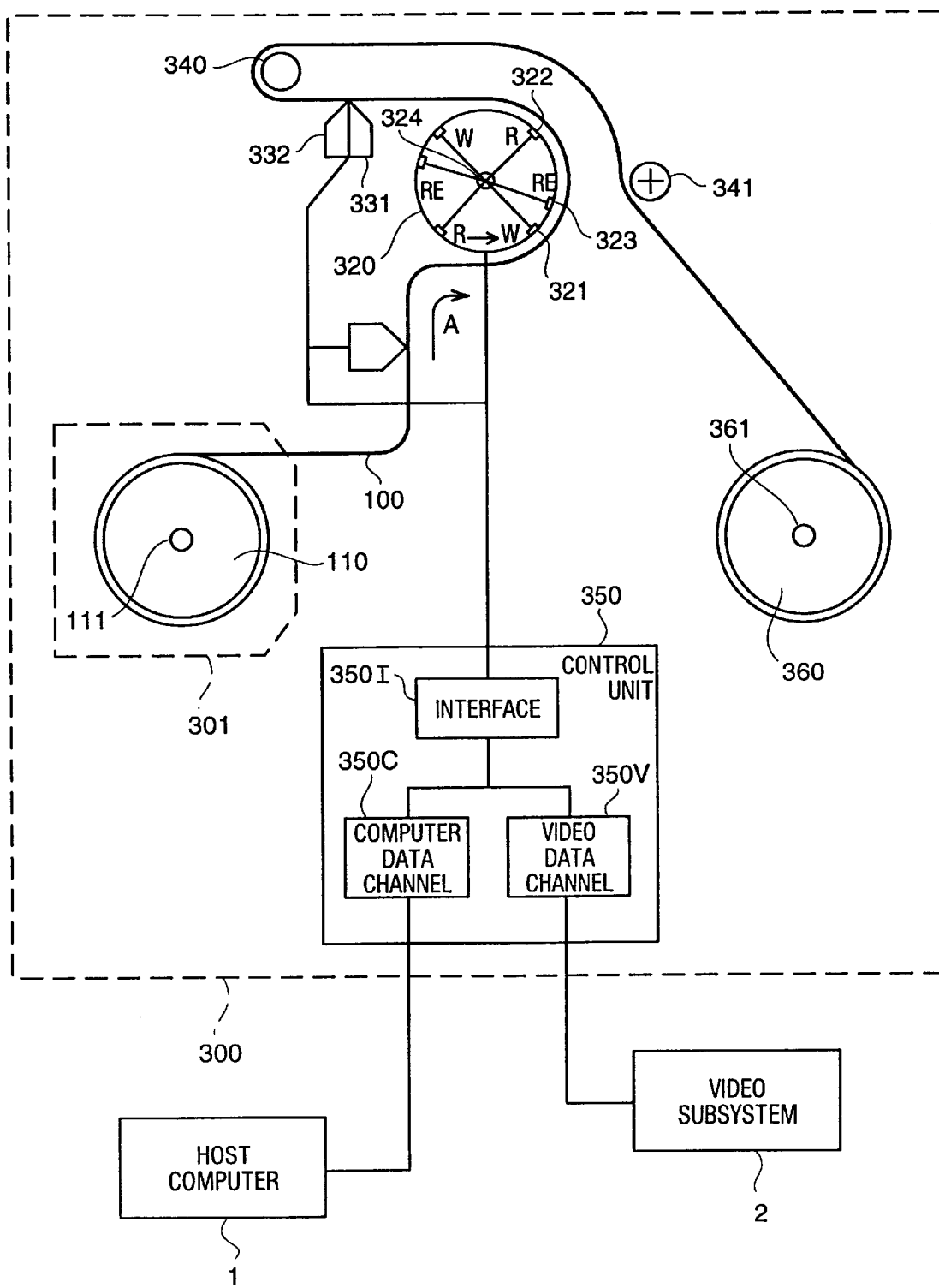
FIG. 3 illustrates in block diagram form the overall architecture of the tape drive control unit.

The apparatus illustrated in FIG. 3 represents the tape transport elements found in helical scan tape drive subsystem 300 that are used to read and write data on magnetic tape 100. The magnetic tape 100 is wound on a single reel 110 which rotates around spindle 111 within magnetic tape cartridge 301. In a helical scan tape drive subsystem 300, magnetic tape 100 from magnetic tape cartridge 301 is threaded in direction A past a fixed fill width erase head 310, scanner 320 (which contains two pairs of helical read heads 322 and two pairs of helical write heads 321 and one pair of erase heads 323), a fixed longitudinal erase head 331 and a fixed longitudinal read/write head 332. The magnetic tape 100 then passes around guide 340, over capstan 341 to be wound on machine reel 360 which rotates around spindle 361. The fill width erase head 310 erases the entire width of magnetic tape 100 and is used when data is recorded on virgin tape. It is also used when data is corded on a previously used magnetic tape, if none of the data previously recorded on magnetic tape 100 is to be preserved.

One of the two illustrated sources of data, host processor 1 or video subsystem 2, transmits a stream of data to control unit 350 in tape drive subsystem 300, where the data are formatted for writing in helical scan form on magnetic tape 100 via scanner 320. The tape wrap angle around scanner 320 is slightly greater than 180° so that a pair of read heads 322, a pair of write heads 321 and one erase head 323 are constantly in contact with magnetic tape 100 in order to continuously read and write data thereon. The helical write head pairs 321 simultaneously record two tracks of data at a time on magnetic tape 100 with an azimuth angle between adjacent tracks being approximately plus and minus 20°. Similarly, helical read head pairs 322 simultaneously play back two tracks of data at a time from magnetic tape 100. There are also three fixed longitudinal erase 331 and read/write heads 332 to read and write data on the corresponding three longitudinal tracks contained on magnetic tape 100: control, time code and one to be determined. These three longitudinal read/write heads 332 can be used individually or in any combination when editing new information into pre-recorded data.

Tape drive control unit includes two data channels: video data channel 350V and computer data channel 350C. These two data channels 350V, 350C are connected in parallel and comprise a typical video tape data channel and a typical computer tape cartridge data channel, respectively. The use of the pair of data channels 350V, 350C enables the tape drive subsystem 300 to process both video data and computer data. The data are recorded on the magnetic tape, which as shown herein is a single reel magnetic tape cartridge. The data channels 350V, 350C function to transform the data received from a source of data, either host computer 1 or video subsystem 2, into a format used by the magnetic tape 100 and to format the data retrieved from the magnetic tape 100 into a format used by the device that requests data from a magnetic tape that is mounted in tape drive subsystem 300. The format conversion for video data differs from that for computer data and the parallel connected data channels enable the tape drive subsystem 300 to accommodate both types of data, which are written on the same type of medium, which in this example is a single reel magnetic tape cartridge, but which can be any writable medium located in a mountable media element.
Interface Element The tape drive subsystem 300 illustrated in FIG. 3 includes an interface element 350I that functions to interconnect the video data channel 350V and the computer data channel 350C with the read/write apparatus of the tape drive subsystem 300. The interface element 350I operates when a data read operation is requested by either host computer 1 or video subsystem 2, to make the determination whether a magnetic tape 100 loaded in tape drive 300 contains video data or computer data. This is accomplished by analyzing the data initially read from the magnetic tape 100 as noted hereinbelow. Once the determination is made, interface element 350I switchably interconnects the one of video data channel 350V or computer data channel 350C with the read/write heads of tape drive subsystem 300.

Figure 11:
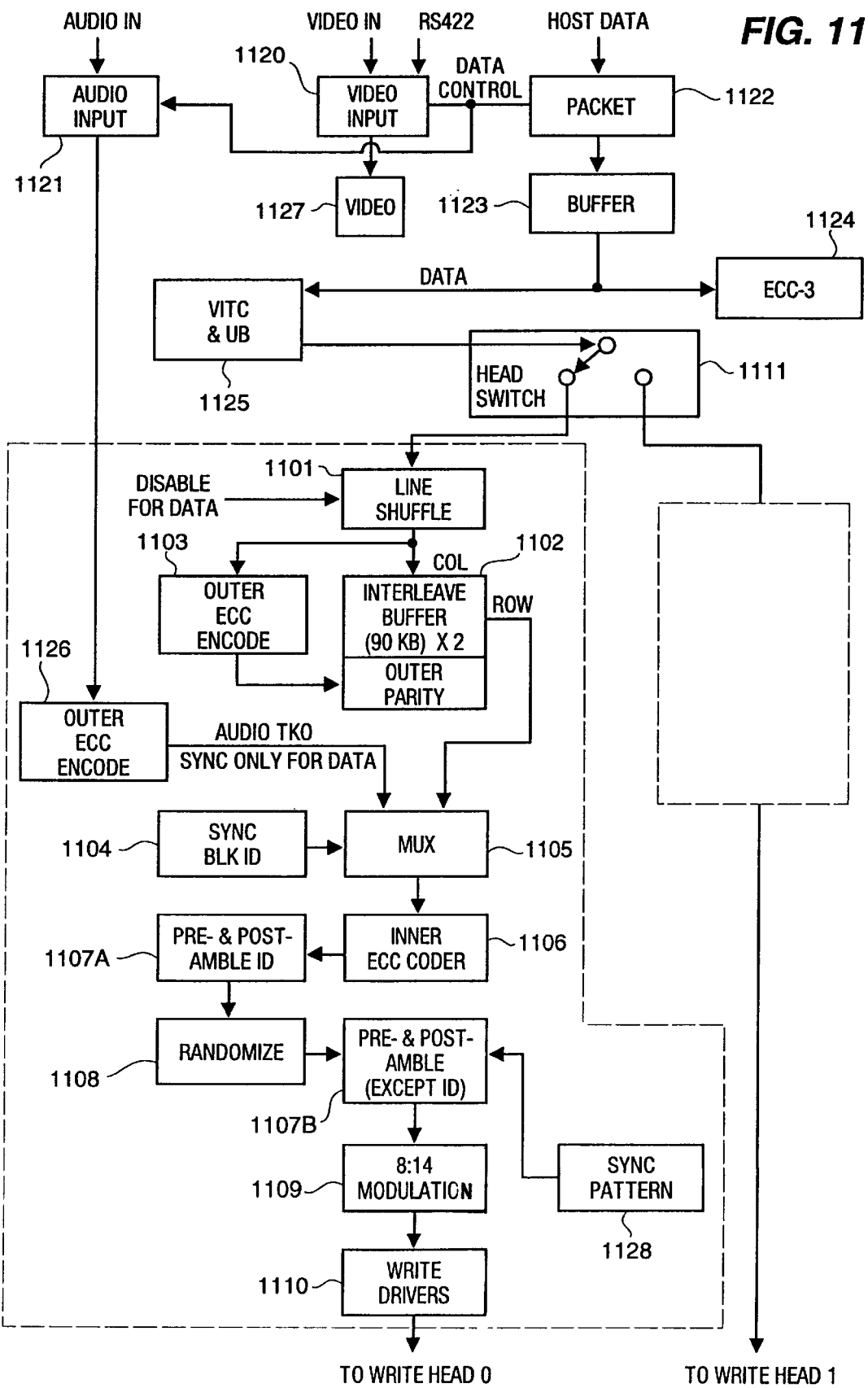
FIGS. 11 and 12 illustrate in block diagram form the details of the interface circuit.

FIG. 11 illustrates in block diagram form the details of the write portion of interface circuit 350I, which functions the inverse of the read portion, which read portion includes circuitry that corresponds to what is illustrated in FIG. 11.

Data are received at tape drive subsystem 300 from either host computer 1 or video subsystem 2. If the data arrive from the video subsystem 2, first and second segments are concurrently entered into video input device 1120 and audio input device 1121, respectively. In addition, control information can be received via RS422 interface in video input 1120. If the data stream arrives from host computer 1, it is entered into packet interface 1122, where it is decoded and written to buffer memory 1123. The receipt of data by a one of video input device 1120, audio input device 1121 or packet interface 1122, causes the data receiving device to transmit control information to the remaining ones of these devices to indicate that input data is being received. The transmitted control instructions function to lock out the presently inactive channel so that only one class of data is processed at a time. This arbitration scheme prevents host computer 1 and video subsystem 2 from concurrently writing data on to a single magnetic tape 100 loaded into tape drive subsystem 300.

An ECC-3 generator 1124 monitors the data stream that is output from buffer memory 1123 and produces a third level ECC as described below. The output of the audio input device 1121 is processed by an outer ECC encoders 1126 as described further below. The primary data path of the video and computer data is via video/data switch 1127 to VITC & UB device 1125 where a time code is generated and inserted into the helical tracks of data for 1X type of searching. In addition, user bytes 6f data can also be written into the helical tracks of data by this device. A head switch 1111 selects data to be written to one or the other of the two parallel write heads 321 via two parallel write paths (1102-to 1110-) one of which is illustrated as a dotted line box on FIG. 11 for simplicity of illustration. The data that is transferred from buffer memory 1123 or video input device 1120 through bead switch 1111 is passe to line shuffle 1101 which is a well known device in video data processing. The line shuffle 1101 processes the input video data to spread gaps in the received input data in a line by line manner that renders such gaps less noticeable to the user. Since line shuffle 1101 is operative on video data, it is disabled by the control signals generated by packet interface when computer data is being received.

The data output from line shuffle 1101 is written into a field memory array 1102 (also termed interleave buffer) so that data can continuously be supplied to rotating write heads 321. While the data is being read in 128 byte segments into field memory array 1102, it is also applied to the input of outer ECC encoder 1103 to produce 8 check bytes of a Reed Solomon error correcting code to detect errors in the data that is written to and subsequently read from magnetic tape 100. The outer ECC encoder 1103 produces a Reed Solomon code RS(136,128) using a Galois Field of 256. The representation of the Galois Field used by outer ECC encoder 1103 is that generated by the primitive polynomial:

$$p(x)=x^8+x^4+x^3+x^2+1$$

The outer ECC generator polynomial is:

$$G(x)=(x+1)(x+a)(x+a^2)(x+a^3)(x+a^4)(x+a^5)(x+a^6)(x+a^7)$$

where the term "a" denotes the primitive element of the field and is equal to 00000010 binary. The field memory array 1102 is divided into two equal segments so that an equivalent amount of data can be supplied to each of the pair of write heads 321 on scanner 320. The data from buffer memory 1123 is written into field memory array 1102 on a column by column basis, from column 0 to column 764, and is read out of field memory 1102 on a row by row basis, from row 0 to row 135, including the 8 byte parity code generated by the outer ECC encoder 1103. The field memory array 1102 therefore has a memory capacity of 765 columns * 136 rows=104,040 bytes. The data stored therein are read out by rows to form sync blocks of eighty-five data bytes each, or nine sync blocks per row.

In the case where the data received by the tape drive 300 is video data, the outer ECC encoders 1126 function in the same manner as the outer ECC encoders 1103 described above. The multiplexor 1105 incorporates the video data obtained from field memory array 1102 with the audio data received from the active one of outer ECC encoders 1126. This combined audio and video data is also combined with the data received from synchronization block identification circuit 1104. To each eighty-five data byte sync block is added a two byte identification field which contains a sync block identification number which is incremented by one for each subsequent synchronization block received by channel write circuits 811. The eighty-seven data byte block resulting from the concatenation of the two synchronization ID bytes and the eighty-five data bytes read from field memory array 1102 is then passed to inner ECC encoder circuit 1106. The inner ECC encoder 1106 appends eight check bytes to each eighty-seven byte block received from multiplexor 1105. The inner ECC encoder 1106 is a Reed Solomon code generator RS(95,87). The Galois Field used by inner ECC encoder 1106 is GF(256) and the representation used by inner ECC encoder 1106 is that generated by the primitive polynomial:

$$V(x)=x^8+x^4+x^3+x^2+1$$

The inner ECC generator polynomial is therefore:

$$G(x)=(x+1)(x+a)(x+a^2)(x+a^3)(x+a^4)(x+a^5)(x+a^6)(x+a^7)$$

where the term "a" denotes the primitive element of the field and is equal to 00000010 binary.

The resultant ninety-five byte block is passed to pre- and post- amble identification circuit 1107A where preamble and postamble identification data is added to the scan group that is generated. The resultant data blocks are randomized by randomizer circuit 1108 by exclusive-ORing the serial eighty-seven byte block data stream and the serial data stream generated by the inner ECC encoder polynomial. The random generator contained in randomizer 1108 is initialized to 80(hex) at the first byte of each inner ECC encoder word. The resultant data is then applied to the input of preamble and postamble circuit 1107B which completes the data formatting operation. Sync pattern generator 1128 creates a synchronization pattern which is added to the scan group. An 8:14 modulator circuit 1109 modulates the resultant data and drives the write driver circuits 1110 to write the data on magnetic tape 100 via write heads 321 on scanner 320. The write drivers 1110 send the serial bit stream through a rotary transformer to write head 321 to write data in groups of 2×144KB to write 288KB of data on magnetic tape 100. This circuitry is well known in the helical scan data processing art and is not described in any further detail herein.

Read Circuit Portion of Interface Circuit

Figure 12:
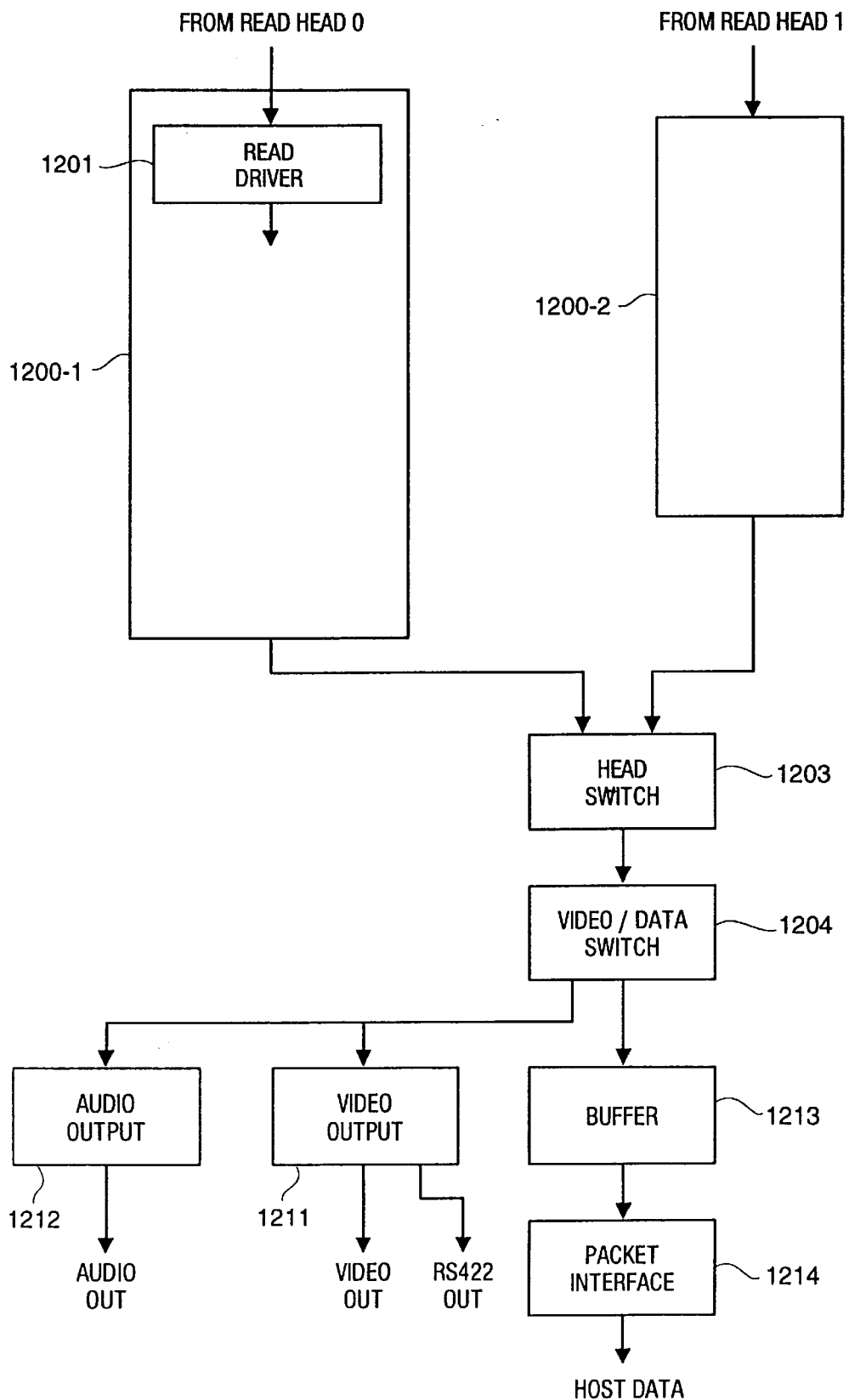

FIG. 12 illustrates in block diagram form the overall architecture of the data read circuit contained in interface circuit 350I that corresponds to the above-described data write circuits. The read heads are connected to read driver 1201 which is a part of read circuit 1200-1 and which functions to transform the sensed magnetic domains on the magnetic tape into digital data. The translated data is demodulated, error checked and deformatted by read circuitry that corresponds, in well known inverse fashion, to the data write circuit of FIG. 11. The resultant data is applied to head switch circuit 1203 which cycles between the two read paths to maintain adequate data read speed. The data output from the head switch circuit 1203 is applied via video/data switch 1204 to either video output 1211 and audio output 1212 circuits if the read data is video data or buffer circuit 1213 and its associated packet interface 1214 for computer data. The determination of the nature of the read data is accomplished by reading the density identification segment of the magnetic tape 100 and the information contained therein causes the read circuitry to activate switch circuit 1204 to direct the received data to either the computer data channel 350C or video data channel 350V.

Physical Format of Helical Scan Magnetic Tape

Figure 1:
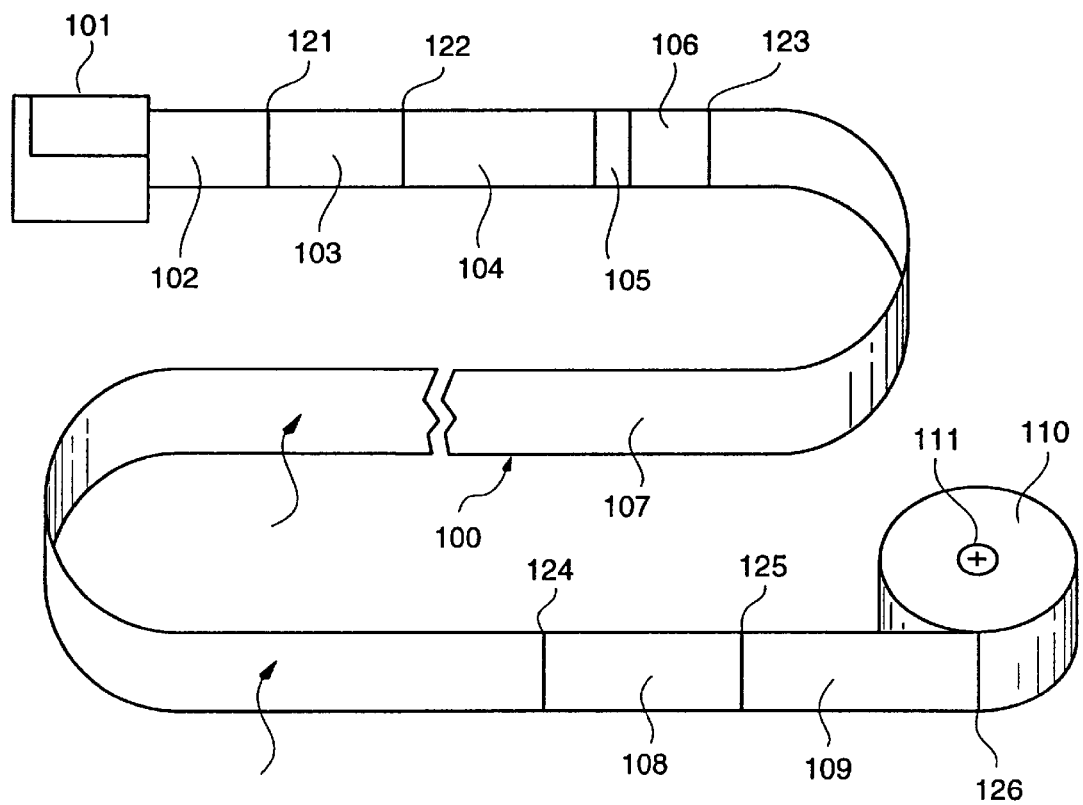
FIG. 1 illustrates the physical format of the magnetic tape media.

FIG. 1 illustrates the physical format of the helical scan magnetic tape 100, including the header (ILH) segment 105 thereof (also termed internal leader header). The magnetic tape 100 includes a leader block 101 that is attached at one end thereto and a single reel 110 around which magnetic tape 100 is wound into cartridge 301. A length of leader 103 is interposed between the leader block 101 and the density identification segment 104 of magnetic tape 100. The leader section 103 includes a beginning of tape hole 102 which provides an indication to the tape drive subsystem 300 that the one end of the magnetic tape 100 is reached. The density identification segment 104 typically consists of 256 5can groups 700 (FIG. 2) written on magnetic tape 100. The density identification segment 104 represents data, for tape drive control unit 350 to access, indicative of the format of the data recorded on magnetic tape 100. Internal leader header segment 105 is located at the end of density identification segment 104 of magnetic tape 100. The internal leader header 105 consists of a three scan groups 700, the third of which is an ECC scan group to error check the two preceding internal leader header scan groups. The internal leader header 105 is followed by separator segment 106 of magnetic tape 100, which typically consists of 125 scan groups. The separator segment 106 isolates the logical beginning of tape (BOT) 123, which is the start of the data area 107 of magnetic tape 100, from the prepended header information described above. The data area 107 of magnetic tape 100 constitutes the majority of magnetic tape 100 and ends at physical end of tape 125 which is a predetermined distance from tape to hub junction 126, wherein magnetic tape 100 is affixed to single reel 110 of magnetic tape cartridge 301. A length of trailer tape 109 may be interposed between the physical end of tape 125 and tape to hub junction 126. This serves as a method of wrapping magnetic tape 100 around the reel 110 in order to provide a method of attachment thereto and also includes an end of tape hole 124 which indicates to tape drive subsystem 300 that an end of the magnetic tape 100 has been reached.

Internal Leader Header

The internal leader header 105 consists of administrative information which typically includes:

Data Record Directors
Logical block locations
Administrative Information
Location of last Data Scan group written
Number of volume loads
Number of read/write errors for the last n mounts
Serial number of last m drives upon which this cartridge was mounted
Volume ID
Time and data stamp of mount
Tape type and length
Safe File information
Manufacturer's ID and Production Batch Numbers The internal leader header segment 105 of magnetic tape 100 is read on every load of magnetic tape cartridge 301 into a tape drive subsystem 300. The internal leader header segment 105 is updated by magnetic tape drive subsystem 300 prior to magnetic tape 100 being physically unloaded therefrom in order to update the header information concerning read and write information contained therein. The internal leader header 105 illustrated in FIG. 5 includes two segments: administrative information 501, and data record search directory 502. The data record search directory 502 includes a plurality of entries (502-1 to 502-n), one for each search segment boundary that is crossed.

Data Record Directory

Figures 5, 6, 7:
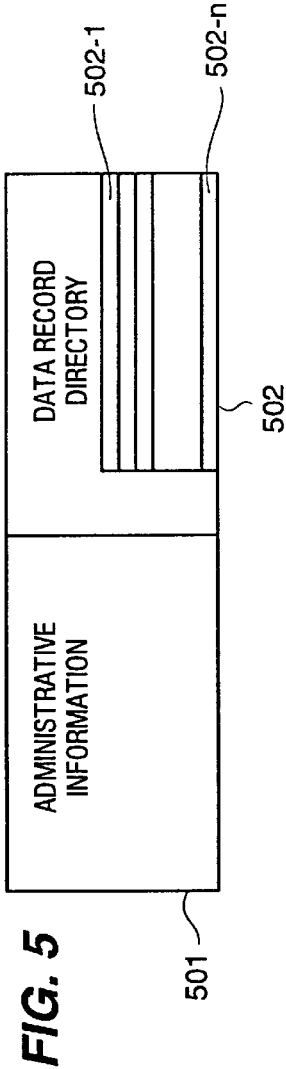
FIG. 5 illustrates the elements contained in the header segment of the magnetic tape.
FIG. 6 illustrates the elements contained in the directory section of the header segment of the magnetic tape.
FIG. 7 illustrates the elements contained in the administrative section of the header segment of the magnetic tape.

Each directory entry 502-* includes the information illustrated in FIG. 6. The first element in the entry is a physical scan group count 601 of four bytes length which represents a unique physical location on magnetic tape 100. Since each search segment contains a fixed number of scan groups 700 written on to magnetic tape 100, the location of a specific scan group within the selected search segment is a simple process of positioning the magnetic tape 100 a calculated distance from the beginning of tape point. The second element contained in the entry is a file identification number 602 of three bytes which identifies a numerical file in which scan group 700 is contained. The file identification 602 is used internally in tape drive subsystem 300. The file identification 602 is also termed file marks or tape marks and are sent from the host processor 1 and are used to separate data. This file ID number 602 provides a scan group to file correspondence in order to simplify the administering of the data within files on magnetic tape 100. The third element contained in the entry is a logical block number of first starting host processor data packet within a super group 603, which is a five byte long field. This block number identifies the first data group of a super group that follows the search segment boundary. The final element in the entry is a reserved field 604 of twenty bytes for future use.

Administrative Information

FIG. 7 illustrates the information typically contained in the administration information section 501 of internal leader header 105. A first segment of information contained in internal leader header 105 is the volume identification 1001 which consists of 80 bytes that represent the volume identification number assigned to magnetic tape cartridge 301. A second section of administrative information 501 is the tape type and length, which is a one byte long field to indicate the type of media and its length. A third segment 1003 of administrative information is the tape manufacturer's identification and production batch number, which consists of 128 bytes of information, to provide the user with information concerning the date of manufacture of this media as well as the identification of the manufacturer and their particular production batch number. This information assists the user in identifying media that has been recalled by the manufacturer or media of a certain class that is more prone to errors than other similar types of media.

Data Format of the Helical Scan Magnetic Tape

Figure 2:
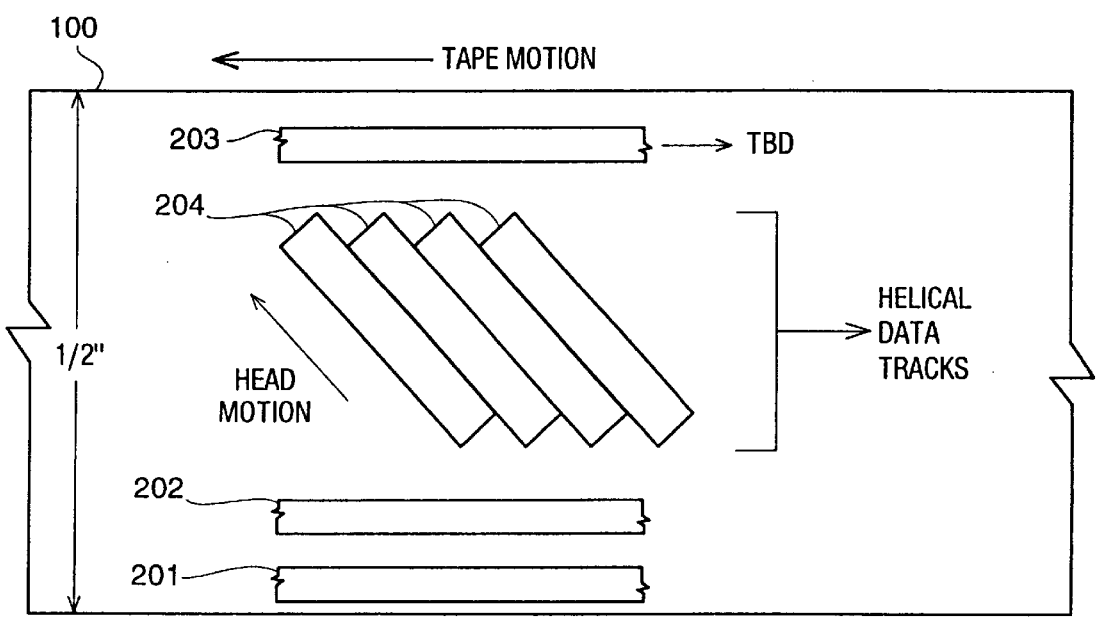
FIG. 2 illustrates the data recording format of helical scan magnetic tape.

FIG. 2 illustrates the data recording format of helical scan magnetic tape 100 used herein. The scan group 700 is the basic unit for formatting data on magnetic tape 100. As two adjacent write heads 321 of scanner 320 move across magnetic tape 100, two helical tracks 204 of data are simultaneously written on to magnetic tape 100. Once scanner 320 has completed one half of a revolution, the other pair of write heads 321 begins to write the next two adjacent tracks 204 on to magnetic tape 100. One and a half revolutions of scanner 320 produce the six tracks (1–6) illustrated in FIG. 2 to complete a single scan group 700. As can be seen from FIG. 2, a postamble 703 and preamble 701 are written on either end of the data area 702 of each track 204 written on to magnetic tape 100 in order to enable read heads 322 to accurately read the data contained therein.

Longitudinal Tracks

The tape format for helical scan recorded magnetic tape 100 includes three longitudinal tracks 201–203 written on magnetic tape 100: servo control track 202, time code track 201 and one track 203, the use of which is to be determined. The servo control 202 and time code 201 tracks are located at the bottom of magnetic tape 100 while the unused track 203 is located at the top of magnetic tape 100. The servo control track 202 is recorded as helical tracks 204 are written onto magnetic tape 100 and contains pulse edges that mark the location of each helical track pair written on to magnetic tape 100. One use of servo control track 202 is to synchronize, during playback, the rotation of scanner 320 with the position of helical tracks 204 on magnetic tape 100. The time code track 201 is recorded as helical tracks 204 are written on to magnetic tape 100. The time code track 201 contains location information that uniquely identifies each scan group pair 700 on magnetic tape 100. Similar location information is contained in the helical tracks 204 themselves, but the longitudinal time code track 201 can be read at a higher tape speed, i.e., at 60× normal recording speed. This information can be used to position magnetic tape 100, while being transported at a 60+ or 100× normal recording speed, to a specified scan group 700, based on scan group location information contained in the data record directory section 502 of internal leader header 105.

Video Data Format

The tape drive subsystem 300 functions as a digital video tape recorder which uses a ½" magnetic tape as the data storage media and uses a digital recording format as described above, which is compatible with the presently used NTSC and PAL (525/60 and 625/50 lines/inch and frames per minute) video broadcast standards. The digital format of the recording, using data processing quality error detection and correction techniques enables all digital video acquisition, post production processing in a studio environment, unlimited reproduction and transmission without signal degradation. It is expected that this system will be compatible with future high definition television (HDTV) standards and requirements in terms of data rate and quality. In contrast, analog video tape restricts the number of derivative copies that are created since the signal to noise ratio and bandwidth available to create successive copies is reduced. Analog video tapes accumulate errors in successive copies, thereby degrading performance for each successive copy produced. Digital recording techniques provide error detection and correction to produce flawless copies, regardless of the number of successive copies manufactured.

The two basic operating modes of tape drive subsystem 300 are:
1. Recording and playback of 48 KHz digital audio and 13.5 MHz sample rate digital video in full 10-bit component form in both NTSC and PAL format. In this mode, the digital video data recorder must interface with a 270 Mbps serial digital stream of data from the video source.
2. Recording and playback of digital composite audio and video at a sample rate of 18 MHz in full 10-bit form.

Data Record Read From Magnetic Tape

Figure 4:
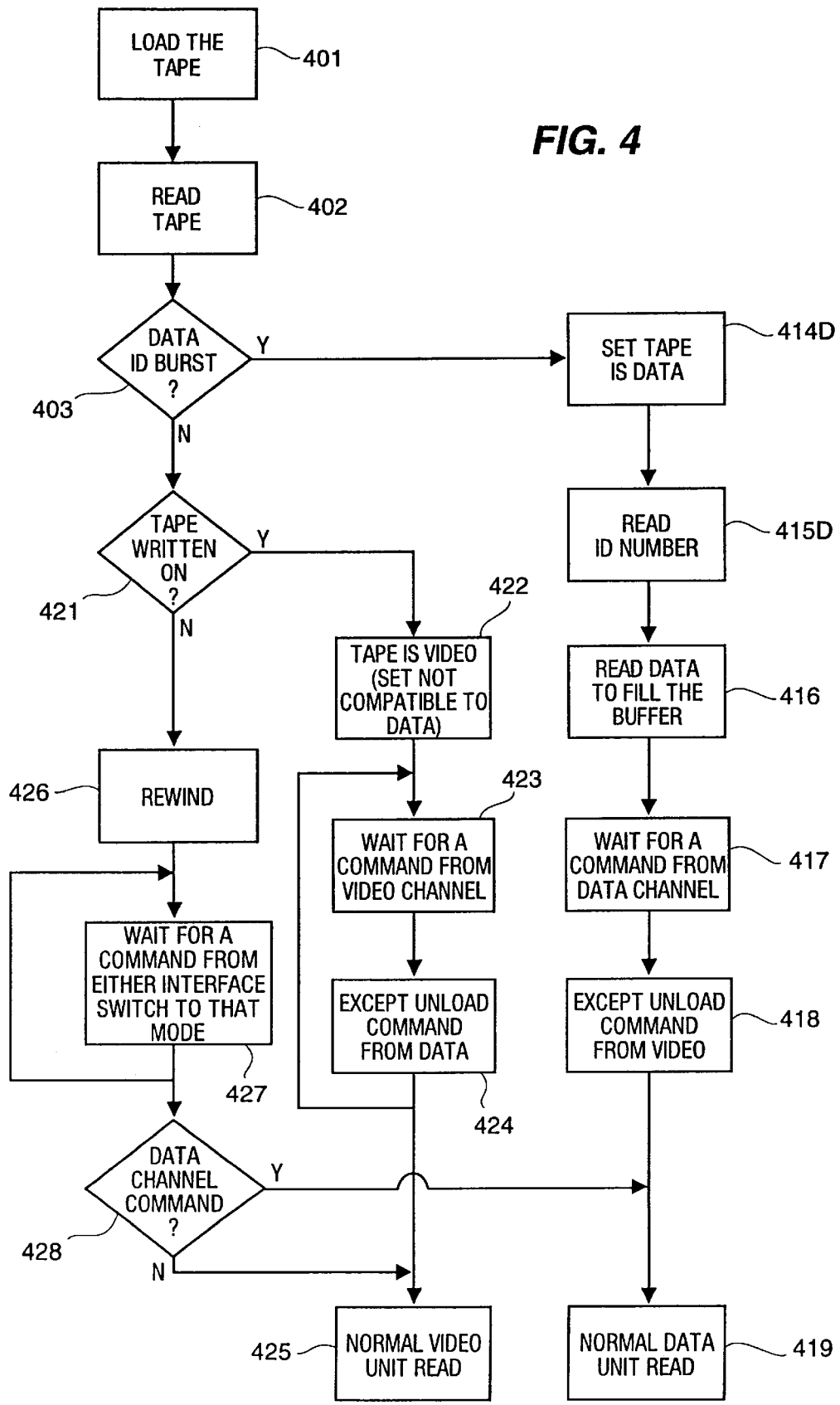
FIG. 4 illustrates in flow diagram form the operational steps taken by the tape drive control unit to differentiate between a computer data tape and a video data tape loaded in the tape drive.

FIG. 4 illustrates in flow diagram form the operational steps taken by tape drive subsystem 300 to read data in helical scan form from magnetic tape 100. At step 401, a magnetic tape cartridge 301 is inserted into tape drive subsystem 300 and the tape drive mechanism illustrated in FIG. 3 loads the magnetic tape 100 by threading the leader block 101 and magnetic tape 100 through the tape threading path to the takeup reel 360 which rotates around spindle 361. At step 402, magnetic tape 100 is advanced forward in order to enable the tape drive control unit 350 to read the density identification 104 and internal leader header 105 written on to this magnetic tape 100 via read heads 322 of scanner 320. If this tape is a computer data tape, there is a data identification burst on this magnetic tape 100 in the header 105 and/or density identification 104. If the tape drive control unit 350 detects the presence of this data identification burst on the magnetic tape 100 at step 403, the tape drive control unit 350 denotes the loaded magnetic tape 100 as a tape that contains computer data. Processing advances to steps 414–419 where the data written on the magnetic tape 100 is processed as computer data. In particular, at step 414, the tape drive control unit 350 sets a flag bit in its memory to indicate that the magnetic tape 100 loaded in the tape drive subsystem 300 is a computer data tape. In addition, the video data channel 350V is disabled and any data read from the magnetic tape 100 is routed to the computer data channel 350C of the tape drive subsystem 300. At step 415, the tape drive control unit 350 reads the internal leader header 105 from the magnetic tape 100 and, at step 416, continues to read the magnetic tape 100 to load data into the buffer memory for potential use by the host processor 1. The tape drive control unit 350 at step 417 waits for the host processor 1 to transmit a command to the tape drive subsystem 300 via the data channel 2. At step 418 the tape drive control unit 350 sets another flag in its memory to except an unload command from the video data channel 350. This ensures that an extraneous load data magnetic tape that was loaded by mistake can be unloaded by the video channel. Processing then advances to step 19 wherein normal reading of computer data from the loaded magnetic tape 100 proceeds.

If at step 403, the tape drive control unit 350 does not detect the presence of the data identification burst written onto the loaded magnetic tape 100, processing advances to step 421 where it is determined whether the loaded magnetic tape 100 is a blank tape or a magnetic tape 100 that contains video data. If no data is found on the magnetic tape 100 by scanning the media for a predetermined length of tape, the tape drive control unit 350 at step 426 halts forward motion of the magnetic tape 100 and rewinds the magnetic tape 100 to the beginning. At step 427, the tape drive control unit 350 waits for a command from either the computer data channel 350C or the video data channel 350V and at step 428 switches to the mode that corresponds to the source of the command, when received.

At step 421, if the tape drive control unit 350 locates data written on the loaded magnetic tape 100, absent the presence of a data identification burst, a determination is made that this loaded magnetic tape 100 contains video data written thereon. At step 422, the tape drive control unit 350 sets a flag bit in its memory to indicate that the magnetic tape 100 loaded in the tape drive subsystem 300 is a video tape. In addition, the data channel 350V is disabled and any read from the magnetic tape 100 is routed to the video channel 350V of the tape drive subsystem 300. The tape drive control unit 350 at step 423 waits for the host processor 1 to transmit a command to the tape drive subsystem 300 via the video channel 2. At step 424 the tape drive control unit 350 sets another flag in its memory to except an unload command from the computer data channel 350C. This ensures that an extraneous loaded video tape can be unloaded by the data host. Processing then advances to step 425 wherein normal reading of video data from the loaded magnetic tape 100 proceeds.

Robotic Media Library

Figure 8:
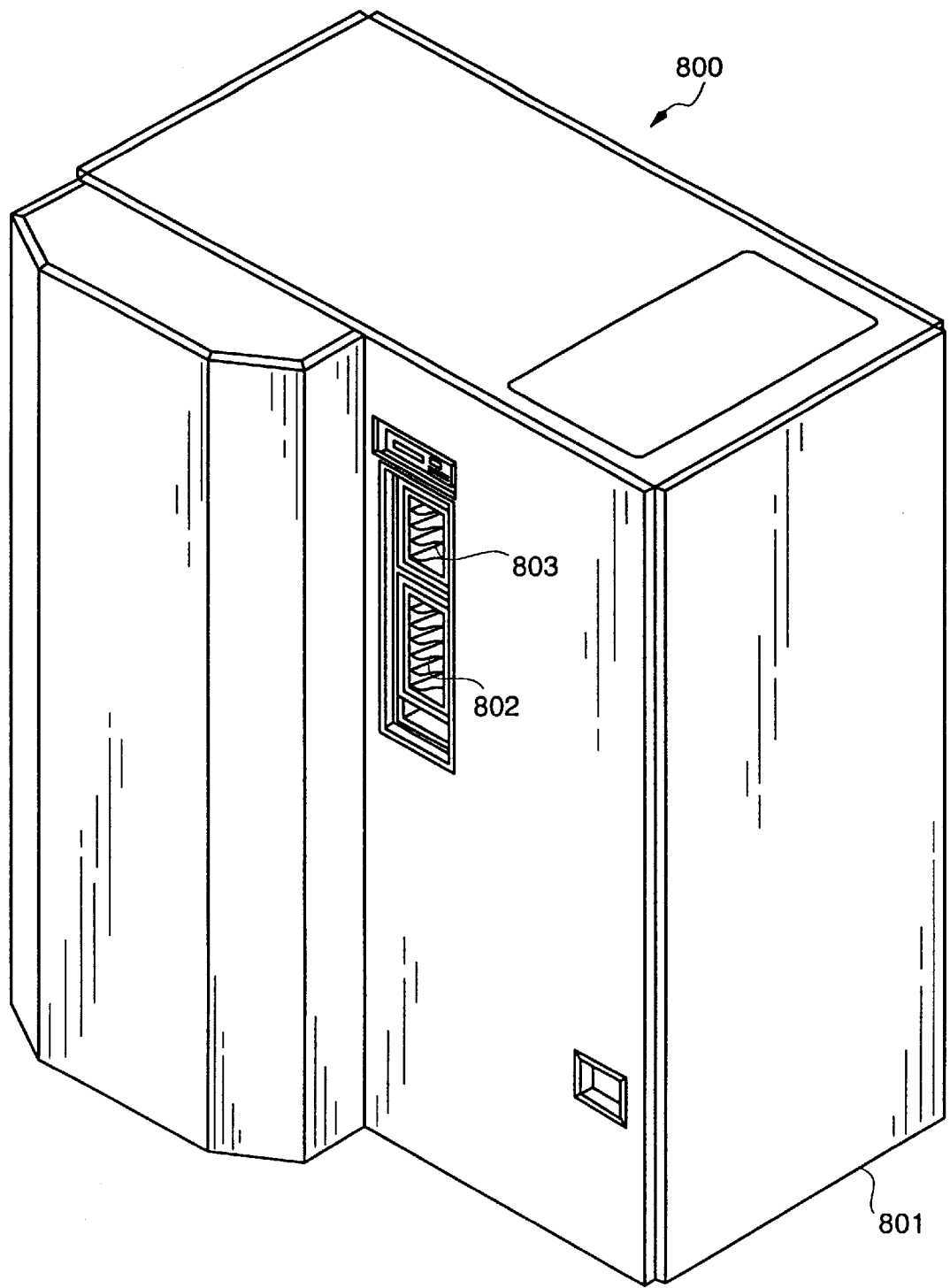
FIGS. 8–10 illustrate in perspective view, top plan view, and side cross-section view, respectively, an automated cartridge library system that incorporates the tape drive of the present invention.
Figure 9:
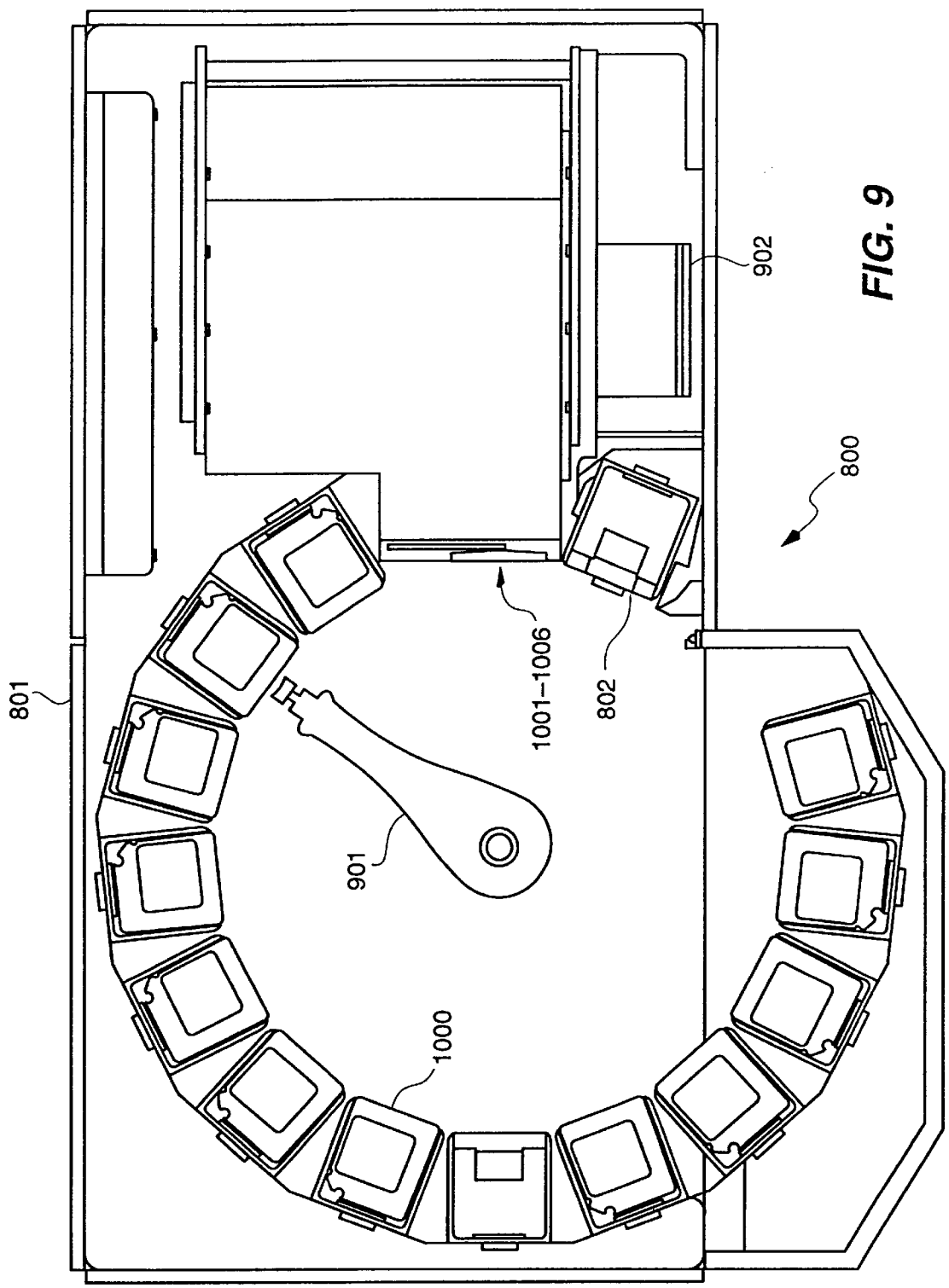
Figure 10:
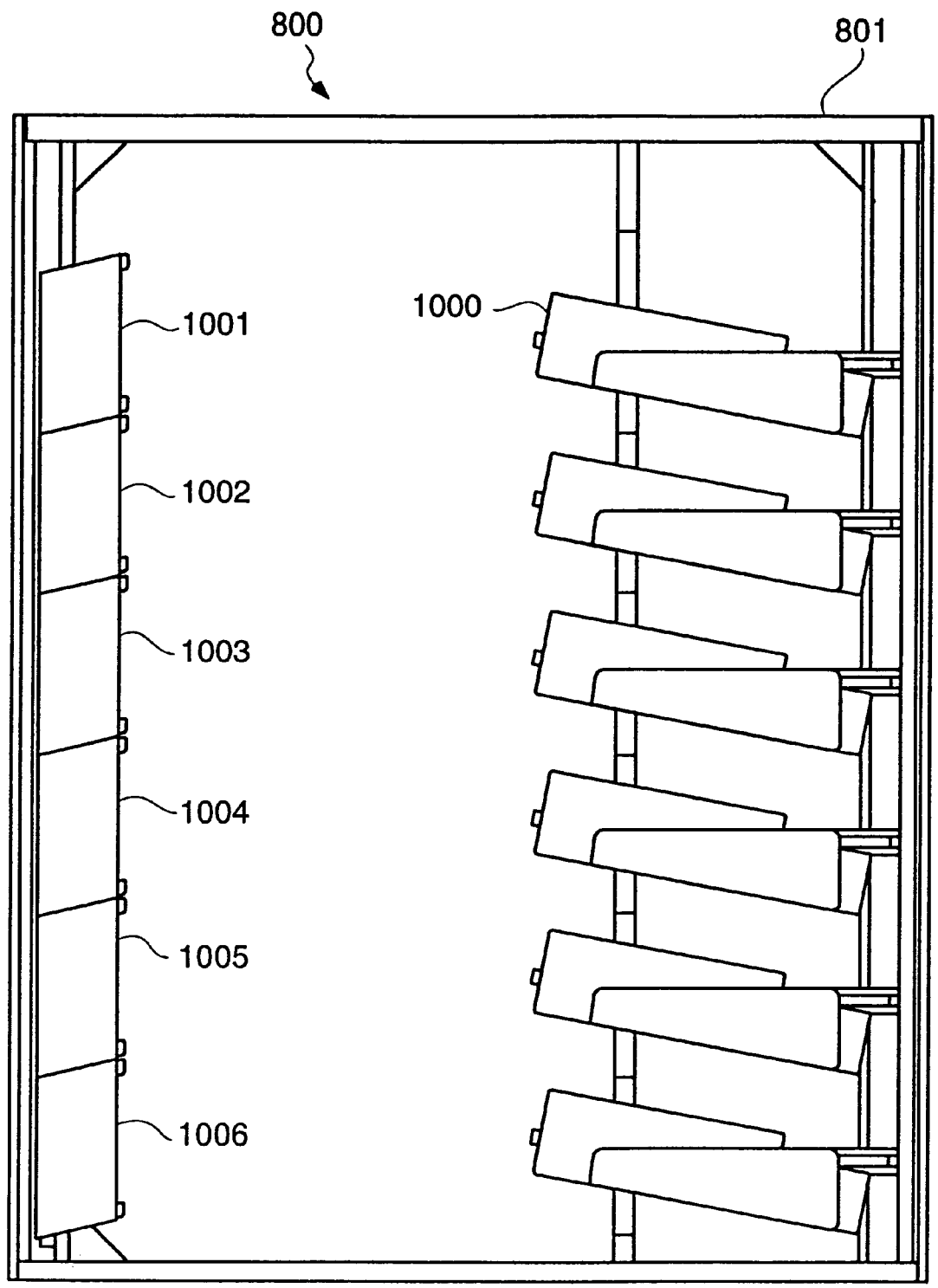

The tape drive subsystem 300 can be installed in conjunction with an automated cartridge library system for robotically transferring the magnetic tape cartridges between the plurality of cartridge storage cells in the library and the tape drive subsystem 300. FIG. 8 illustrates a perspective view of a typical automated cartridge library system 800, while FIG. 9 illustrates a top plan view of the library 800 and FIG. 10 illustrates a side cross-section view of automated cartridge library system 800.

The automated cartridge library system 800 consists of a plurality of tape drive subsystems 300 (1001–1006 in FIG. 10) that are installed in a housing 801 along with the robotic cartridge retrieval mechanism 901. There are a plurality of magnetic tape cartridge storage cells 1001, arranged in a plurality (14 columns shown in FIG. 9) of vertically arranged columns of cartridge storage cells 1001, shown arranged six cells 1001 in a column in FIG. 10. Also included in the automated cartridge library system 800 can be a cartridge load/unload mechanism 802 which enables a user to pass magnetic tape cartridges into the automated cartridge library system 800 or retrieve magnetic tape cartridges from the automated cartridge library system 800. The cartridge load/unload mechanism 802 includes a plurality of cartridge storage cells 803 that rotate between the position illustrated in FIG. 8 wherein the cartridge load/unload slots 803 face outward, and the position illustrated in FIG. 9 wherein the cartridge load/unload slots 803 face the robotic cartridge retrieval mechanism 901.

In operation, cartridge retrieval commands are transmitted to control circuits 902 located in the automated cartridge library system 800 from a computer (not shown). The control circuits 902 translate the received commands into control signals that regulate the operation of cartridge load/unload mechanism 802. A typical tape mount command causes the cartridge load/unload mechanism 802 to position a cartridge retrieval arm 903 opposite a selected cartridge storage cell 1001, to extract the magnetic tape cartridge stored therefrom. The control circuits 902 then activate cartridge retrieval arm 903 to reposition opposite a selected one of the plurality of tape drives 1001–1006 to load the tape cartridge grasped by cartridge retrieval arm 903 into the selected one of tape drives 1001–1006.

The implementation details of automated cartridge library system 800 represent one of the multitude of possible implementations of an automated library system that are possible. There is no intention to limit the scope of the invention to the specifics of the automated cartridge library system 800 described herein.

SUMMARY

The tape drive control unit automatically determines the type of data written on the magnetic tape media independent of the host processor. This determination is made immediately upon loading the magnetic tape media into the tape drive by sensing the presence/absence of the header portion of the magnetic tape and whether data is written on the magnetic tape. In response to this determination, the tape drive control unit activates one of the two data channels (computer data, video data) contained therein to process the data written on the magnetic tape.

While a specific embodiment of this invention has been disclosed, it is expected that those skilled in the art can and will design alternate embodiments of this invention that fall within the scope of the appended claims.

We claim:

1. A system having a control unit that controllably interconnects a tape drive with a computer means and a video means;
    said tape drive comprising means for reading magnetic tapes each containing a single one of a plurality of different data types along substantially the entire length of each said magnetic tape;
    each said magnetic tape containing a header when said data type on said each magnetic tape represents computer data and being devoid of a header when said data type on each said magnetic tape represents video data;
    said control unit comprising:
        means responsive to a single reading of a portion of each said magnetic tape for detecting a presence or an absence of a header on said portion of each said magnetic tape;
        means for selectivley routing data read from each said magnetic tape to said computer means in response to a detection of said presence of a header on each said magnetic tape; and
        means for selectively routing said data read from each said magnetic tape to said video means in response to a detection of said absence of a header on each said magnetic tape.

2. The system of claim 1 wherein a magnetic tape cartridge houses a single reel of each said magnetic tape having an end terminating in a leader block, and said means for reading comprises:
    means for reading said portion of each said magnetic tape that is a predetermined length of a magnetic tape starting at a point substantially adjacent said leader block.

3. The system of claim 2 wherein said control unit further comprises:
    means responsive to said detection of said absence of a header for detecting a presence or an absence of data on each said magnetic tape; and
    means for halting a reading of each said magnetic tape responsive to a detection of said absence of data on each said magnetic tape.

4. The system of claim 1 wherein said control unit further comprises:
    means for entering a header read from a magnetic tape into a memory of said control unit; and
    said means for selectively routing data read from each said magnetic tape to said computer means being responsive to said header being entered into said memory.

5. The system of claim 4 wherein said control unit further comprises:
    means responsive to said detection of said absence of a header on each said magnetic tape for detecting a presence or an absence of data on each said magnetic tape; and
    means responsive to a detection of said absence of data on each said magnetic tape for halting a reading of each said magnetic tape.

6. The system of claim 1 further comprising:
    robotic magnetic media library means for robotically storing and retrieving magnetic tapes for reading by said tape drive, said library means comprising:

a plurality of magnetic tape storage cells wherein each of said magnetic tape storage cells stores one of said magnetic tapes;

means for robotically transferring, one at a time, each of said magnetic tapes stored in said plurality of magnetic tape storage cells between said tape drive and said plurality of magnetic tape storage cells.

7. A method for operating a system having a control unit that contollably interconnects a tape drive with a computer means and a video means, said method comprising the steps:

operating said tape drive to read magnetic tapes each containing a single one of a plurality of different data types along substantially the entire length of each said magnetic tape;

each said magnetic tape containing a header when said data type on each said magnetic tape represents computer data and being devoid of a header when said data type on said each magnetic tape represents video data;

detecting a presence or an absence of a header on a portion of each said magnetic tape in response to reading each said tape;

selectively routing data read from each said magnetic tape to said computer means in response to a detection of said presence of a header on each said magnetic tape; and selectively routing data read from each said magnetic tape to said video means in response to a detection of said absence of a header on each said magnetic tape.

8. The method of claim 7 wherein a magnetic tape cartridge houses a single reel of each said magnetic tape having an end terminating in a leader block, and said step of reading comprises the step of:

reading a predetermined length of each said magnetic tape from a starting point substantially adjacent said leader block.

9. The method of claim 8 further comprising the steps of:

detecting a presence or an absence of data on each said magnetic tape in response to a detection of said absence of a header; and terminating said reading of each said magnetic tape in response to a detection of said absence of data on each said magnetic tape.

10. The method of claim 7 further comprising the steps of:

entering a header read from a magnetic tape into a memory in said control unit; and said step of selectively routing data on each said magnetic tape to said computer means being responsive to said entering of said header into said memory.

11. The method of claim 10 further comprising the steps of:

detecting a presence or absence of data written on each said magnetic tape in response to a detection of said absence of a header on each said magnetic tape; and terminating said reading of each said magnetic tape in response to a detection of said absence of data on each said magnetic tape.

12. The method of claim 7 wherein said tape drive is attached to a robotic magnetic tape library for robotically storing and retrieving magnetic tapes in a plurality of magnetic tape storage cells for reading by said tape drive, the method further comprising the steps of:

robotically transferring, one at a time, magnetic tapes stored in said plurality of magnetic tape storage cells between said tape drive and said plurality of magnetic tape storage cells in which they are stored.

* * * * *